(12) United States Patent
Wolff

(10) Patent No.: US 7,515,999 B2
(45) Date of Patent: Apr. 7, 2009

(54) METHOD AND MEANS FOR PILOTING CONTROL OF A FORWARD-MOVING VEHICLE

(75) Inventor: Adam Wolff, 15 Helen St., West Orange, NJ (US) 07052

(73) Assignee: Adam Wolff, West Orange, NJ (US)

( * ) Notice: Subject to any disclaimer, the term of this patent is extended or adjusted under 35 U.S.C. 154(b) by 0 days.

(21) Appl. No.: 11/593,981

(22) Filed: Nov. 6, 2006

(65) Prior Publication Data

US 2007/0102590 A1     May 10, 2007

Related U.S. Application Data

(60) Provisional application No. 60/733,195, filed on Nov. 4, 2005.

(51) Int. Cl.
*B64C 13/00* (2006.01)
(52) U.S. Cl. .............................................. 701/3; 244/2
(58) Field of Classification Search ..................... 701/3; 244/2, 50, 45 R, 49, 45 A, 46, 39
See application file for complete search history.

(56) References Cited

U.S. PATENT DOCUMENTS

| | | | | |
|---|---|---|---|---|
| 2,746,698 | A * | 5/1956 | Ross | 244/50 |
| 3,994,453 | A | 11/1976 | Firestone | |
| 4,657,207 | A * | 4/1987 | Poling | 244/21 |
| 5,738,302 | A | 4/1998 | Freeland | |
| 6,129,306 | A * | 10/2000 | Pham | 244/2 |
| 6,131,848 | A | 10/2000 | Crow | |
| 6,224,012 | B1 * | 5/2001 | Wooley | 244/2 |
| 6,619,584 | B1 * | 9/2003 | Haynes | 244/2 |
| 6,877,690 | B1 | 4/2005 | Bragg | |
| 7,178,757 | B1 * | 2/2007 | Breese et al. | 244/8 |

OTHER PUBLICATIONS

Adam Wolff, 2008 SAE International Wichita Aviation Technology Congress & Exhibition, 08WATC-0009, Aug. 19, 2008, 11 Pages, SAE International, Warrendale, PA USA.
Joan Hudson, Author Kit 08WATC-0009, Jan. 22, 2008, 1 Page, e-mail abstract acceptance for publication.
Reviewer 196 & 198, Review Scores and Comments on 08 WATC-0009, Apr. 10, 2008-Apr. 21, 2008, 3 pages.
SAE 2008 Wichita Aviation Technology Congress & Exhibition, Exhibit Prospectus, 4 pages, SAE International, Warrendale, PA USA.
SAE 2008 Wichita Aviation Technology Congress & Exhibition, Technical Session Schedule, 13 pages (p. 12, Session WATC4), SAE International, Warrendale, PA USA.

* cited by examiner

*Primary Examiner*—Dalena Tran

(57) ABSTRACT

A method of control and a means for control for a vehicle constructed by temporarily integrating a conventionally controlled motorcycle and a fixed wing flight device. The method includes a means of control for maneuvering a vehicle, enabling a handlebar to tilt, rotate and move up and down; translating these movements to a flight device. The control means for vehicle flight control converts to a ground vehicle control means and vice versa. In one preferred embodiment, the method employs a mechanism comprising an apparatus, including a first means for enabling tilting of the handlebar without rotating the front wheel of the motorbike, and for allowing the handlebar to be raised and lowered without raising and lowering the wheel. The movements of the handlebar are translated to control ailerons, elevator and rudder of the flight device for making roll, yaw, and pitch adjustments.

26 Claims, 7 Drawing Sheets

METHOD AND MEANS FOR PILOTING CONTROL OF A FORWARD-MOVING VEHICLE

CROSS-REFERENCE TO RELATED APPLICATION

This application claims the priority of provisional application No. 60/733,195, which was filed on Nov. 4, 2005.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates, in general, to mechanisms for steering and controlling vehicles, and more particularly, to a method and a mechanism for controlling an airborne vehicle, and more particularly an airborne vehicle constructed by integrating a vehicle such as a motorbike and a fixed wing flight device.

A variety of airborne vehicles and methods and systems for controlling them have been developed in the art. U.S. Pat. No. 6,709,365 to Freeland discloses an airborne vehicle comprising a body, a lifting mechanism, and a steering mechanism. The lifting mechanism comprises first and second counter-rotating propellers mounted in a front end and a rear end, respectively, of the vehicle body. The steering mechanism comprises a plurality of louvers mounted on a bottom of the vehicle body below the propellers. An operator uses a steering mechanism in a passenger position to adjust inclinations of the louvers so as to steer the vehicle.

U.S. Pat. No. 6,131,848 to Crow discloses a roadable airplane consisting of a single-seat three-wheeled vehicle with wing panels hung longitudinally on the sides of the chassis for road use and attached transversely to a spar box for flight. A power train is used that enables the simultaneous powering of two rear wheels and an overhead pusher propeller for transition from road to air travel. A transaxle for a four-wheel automotive vehicle was found to be advantageously suitable for this purpose. Multiple gears and differential outputs drive the wheels, providing a normal automotive performance on the road. A novel joystick assembly is used to steer the front wheel and to control wing flaps, an elevator and a rudder.

U.S. Pat. No. 6,877,690 to Bragg discloses a combination powered parachute and motorcycle that modifies a conventional motorcycle with the addition of various flight components to provide sustained flight for the machine. A peripheral and overhead safety structure is installed upon the motorcycle, with a second flight engine, propeller, folding propeller guard, and fuel system also installed. The flight engine and all of its systems are completely independent of the conventional motorcycle engine used for surface propulsion. A set of laterally disposed stabilizer wheels is also provided for transition from ground to flight and from flight to ground operation. Lift is provided by a folding parafoil device of either the ram air inflated or partially pneumatically inflated type.

In addition the following non-patent publications are known:

Flying motorcycle simulation (x-plane), computerized, without flight controls.

The AirBike™ uses a pair of contra-rotating, ducted fans to generate vectored thrust. (http://www.geocities.com/alliedaerobiker/airbikeology.html) no wheeles.

Aerobike paragliding bicycle, paraglider works with airfoil manipulation not control surfaces (http://www.calvert-trust.org.uk/keswick/aerobike.htm).

PALV, a personal air land vehicle; comprising a three-winged autogiro with an integrated cockpit, and standard controls (http://www.sparkdesign.nl/en/actueel/20041013palv/20041013press.html).

Known gliders land with one wheel, and balance with ailerons.

ErCoupe/AirCoupe; with conventional aircraft controls except for integrated rudder control, incapable of road use.

Swiss company Peraves totally enclosed ECOMOBILE motorcycle.

Hangliders use single bar control, weight shift not control surface, push=up, pull=down.

The Flying Motorcycle; not a commercial cycle, only wings detach, with permanent outriggers, no description of control, assume rudder pedals (http://www.transairsystems.com).

U.S. Pat. App. 2005/0109874, Vertical lift flying craft; uses downward forcing fans, not conventional airfoil lift.

U.S. Pat. App. 2005/0040283, Method of propulsion and attitude control in fluid environments and vehicles using said method; uses drive fans and venting to control flight, not a method of driver control.

U.S. Pat. No. 6,568,635, Apparatus and method for flight control of an aircraft; body with adjustable intake ports ducting air into an internal intake manifold U.S. Pat. No. 6,863,242, Method and system for controlling an aircraft control surface; control surface elements mounted to rotate about an axis on a stabilizer element.

U.S. Pat. No. 4,849,900, Flight control system and method; a differential acceleration signal which is used to control elevator control surface of an aircraft to provide enhanced pitch stability.

U.S. Pat. No. 6,889,942, Steerable parachute control system and method; an autonomous guided parachute system for cargo.

U.S. Pat. No. 3,994,453, Method and apparatus for safe solo flight of side-by-side dual-control aircraft from centerplane seat; right hand placed on the right grip of the right control wheel, left hand placed on the left rip of the left control wheel, feet on the most rightward and most leftward of the four rudder pedals, so that a pilot can control the airplane with conventional motion.

U.S. Pat. No. 6,863,242, Method and system for controlling an aircraft control surface; reduce the mass of the stabilizer elements such as the fin, a horizontal stabilizer or a wing structure for example. This known control system introduces into the steering commands set at the rudder bar, nonlinear filtering that depends on the available rudder travel.

Method of Sikorsky helicopter control; uses foot pedals for yaw, bar for tilt (C Gablehouse "Helicopters and Autogiros," 1969)

U.S. Pat. No. 6,892,661, Steering device; supplementing the manual force required.

U.S. Pat. No. 6,885,917, an intelligent deployment schedule for the mast valve, cruise nozzle, canard, horizontal tail, and rotor blade speed reference that increases the flight envelope during the compound mode.

U.S. Pat. No. 6,070,543, Watercraft; describes integrated yaw and roll control method.

The present invention is different from the above devices in that it provides a different method and associated mechanism for controlling an airborne vehicle, comprising the combination of a steering mechanism.

It is therefore an object of the present invention to provide a mechanism that can be used with a conventional vehicle, including a two-wheeled vehicle, for controlling an integrated airborne flight device.

A further object is to provide a method that uses the handlebar of a motorcycle to concurrently and independently control roll, pitch and yaw of the flight device, or a bar that, in conjunction with controlling roll, pitch and yaw of a flight device, manipulates a motorcycle handlebar.

A further object is to provide a mechanism that can be detached from, and does not hinder normal operation of the ground vehicle steering mechanism when it is detached from the flight device.

A further object is to provide a method that enables convenient control and operation of the airborne vehicle. These and other objects of the present invention will become better understood with reference to the appended Summary, Description, and Claims.

Flying personal aircraft can satisfy a desire for adventure and freedom. Unfortunately, the adventure is often limited by the lack of available destinations. A common expression in the aviation community is the "hundred-dollar hamburger." This phrase references the eating-places that are located at small airports for the fly-in customer and the irony of the cost for a simple lunch once the flight expenses are included. People are flying just to pick up a burger, eat a pancake breakfast, or participate in a "fly-in." These events and restaurants have been created as an attempt to solve the lack of destination problem.

Ground transportation removes the limits on personal aviation destinations, but taxicab service, a dedicated destination car, or car rental, all reduce freedom and add cost. Rental cars are only available at larger airports where, in addition to the car rental fees, pilots often incur landing and aircraft storage fees. A pilot that frequents one particular location might leave a car at that destination, but this won't help for other locations. Taxicabs need to be coordinated, often in advance, and can be very expensive.

The solution of the "Flying Car," or "Roadable Aircraft," has previously been attempted with limited success. A "Flying Car" could carry passengers and luggage, but a car requires Department of Motor Vehicles (DMV) roadworthiness adherence, which make them heavy, and aircraft need to be light. Vertical take off and landing (VTOL) crafts, like helicopters, do not require an airport, but are loud, require enormous power, and are complex to build, fly, and maintain. Trailering the wings and flight mechanics of either type of vehicle would enable the "fly-drive-fly" scenario, but wings are big and the road is narrow. However, a motorcycle can drive on the road, carry a pilot/driver and passenger, and is lightweight. A wing/engine device could be attached for flight and left at the airport. An operator on a motorcycle is already dressed for outside operation and generally would wish to avoid excessive cold and bad weather, like an aircraft pilot would.

The standard methods of control of a fixed-wing aircraft and commercially available motorcycle are incompatible, as both require the use of foot controls. A motorcycle is operated with the feet for rear breaking and transmission gear shifting: the right foot operates a pedal that controls the rear breaking; the left foot pushes down and toes-up a lever that changes gears. An aircraft is operated with the feet for both in-flight yaw—pushing on either the right or left pedal steers the aircraft to the right or left—and to control ground maneuvering/ground wheel breaks.

As the disclosed invention will solve this challenge of the flying motorcycle, it is important to note the additional advantages that this model will provide. This device, by using a commercial motorcycle, would reduce the production costs and improve performance; any new product, or vehicle, being made in small-batches would have higher production expenses than a mass-produced item; an incorporated mass-produced motorcycle would provide much of the structure and hardware at expenses lower than custom fabrication; the motorcycle would provide the seats, wheels, suspension, and ground breaks; the large suspension travel and motorcycle wheels would enable takeoff and landing on unfinished ground; the motorcycle engine would enable ground propulsion to assist in takeoff rolls, getting the craft up to speed quickly; the in-line wheels would have lower aerodynamic drag than three wheels, may also enable 'leaning in' to turns, and would avoid the risk of spinning an aircraft around during landing, a common accident with tail-wheel aircraft called a ground loop; Ground maneuvering, or taxiing, could be performed at greater speeds that conventional aircraft because of the improved balance that 'leaning in' could provide.

SUMMARY

The present invention provides a method of controlling an airborne vehicle, in particular a airborne vehicle comprising the combination of a conventional ground vehicle, in particular a motorcycle, and a fixed wing flight device. The invention comprises a method of control; the new method of control uses a handlebar to concurrently and independently affect pitch, roll, and yaw. In addition, the new method of operation concurrently controls steering when on the ground. Steering on the ground is independent of pitch and roll, but in conjunction, or managed with the same movement, as the control of yaw. The new method of control achieves the three axis of fixed-wing flight with the manipulation of a single member, or handlebar. The operator moves the handlebar. The movements are translated to affect a vehicle. There are three movements; each is associated with one of the three axis of fixed-wing flight. The movement that is associated with yaw is also associated with ground steering. The invention secondly comprises a control apparatus, said control apparatus installed onto the motorcycle's fork, or in a secondary embodiment, as a device which makes physical gripping of the existing motorcycle's handlebar and its controls, where the invention's handlebar control is in a position relative to the typically placement of the handlebar. A connection mechanism for connecting the control device and the flight device is also provided.

The control apparatus enables the handlebar to be raised, lowered and tilted. The normal rotation of the handle for operating the motorbike is not affected by installing the control apparatus. In addition, raising, lowering and tilting movements of the handlebar are restricted when the motorbike is detached from the flight device. In a preferred embodiment, the control apparatus can be temporarily locked using locking pins or latches. In accordance with the present invention, a ground vehicle is attached to the fixed wing flight device. The movements of the invention's handlebar control the ground vehicle and are translated to operate aileron, elevator and rudder in order to affect roll, pitch and yaw of the combined ground vehicle and flight device. In a preferred embodiment, the control device analyzes the handlebar movement and translates them via cables-pulley-pushrod systems.

The primary objective of the disclosed inventions is to provide a means and a method for simple and elegant incorporation of a motorcycle, or bicycle, with a separable flight device. What has been invented here is: a device, or a means, for control of the operation of a flight vehicle; removable control linkages that connect a control device for the operation of a vehicle to a flight device; and a new method or manner of operating a forward moving vehicle in three-dimensional space, or a 'flying' vehicle, such as a fixed-wing aircraft.

A control device is installed onto a motorcycle in a manner similar to a common handlebar replacement. The device could be installed by being bolted on to the top of the motorcycle fork where the handlebar is normally attached. The device is attached to the motorcycle, and attached to the device is a handlebar or the motorcycle's original handlebar. The handlebar, attached to the motorcycle by way of the device, will retain the motorcycle's standard handlebar controls of throttle, brake, clutch, and others.

A secondary method to enable the control device to be connected to the motorcycle is for the device to have physical connection to the existing motorcycle handlebar. This connection would clamp to the existing handlebar in such a manner to simulate the actuation that the operator would have made manually. These grips and holding of the device would move and control the existing handlebar controls per the commands given to the device by the operator. These controls being those of clutch, throttle, and brake; non-inclusive.

The control device enables the handlebar to be raised/lowered, and tilted. It is important to note that while the device allows the handlebar to be moved in some defined manners, the device does not allow the handlebar to be slid from side to side, twisted, or to be freely rotated. The device retains rotational rigidity to where it is attached, or the motorcycle's fork. As a motorcycle's handlebar is normally rotated in the control of steering, the operator retains the ability to rotate the handlebar, now attached to the fork by the control device. With this rotational movement of the handlebar, the control device will rotate, and with the fork of the motorcycle in the control of steering.

The device has the ability to temporarily lock in place, to affix the raise/lower and tilt movements of the handlebar into a temporarily fixed position. This locking would be simple to perform with the use of a removable pin or clamp. In locked position the device/handlebar will perform, or be used in, a manner similar to a conventional handlebar, not rising/lowering nor tilting. The control device is meant to be unlocked when the motorcycle is affixed to a flight device.

The motorcycle is attached to, or incorporated into, the flight device in a temporary but secure manner. This incorporation of devices enables the creation of a combination aircraft. The motorcycle part of the aircraft is carried by the flight device when in flight and the flight device part of the aircraft is supported by the motorcycle while taxiing. This incorporation of motorcycle and flight device would create a ridged combination aircraft where the flight device and motorcycle device provide mechanics, that when incorporated, have shared abilities.

As the control device is attached to the motorcycle, and the motorcycle is attached to the flight device, in addition to these attachments, the control device is also attached to the flight device by a control connection device. This control connection device, or mechanism, actuates the transfer of the movements of the handlebar, concurrently and independently, to the flight device to affect the operation of flight.

The new method of operating a vehicle, or method of control, is for a vehicle operating in forward motion through three-dimensional space, or flight, and for operating through two-dimensional space, or ground. This method of control could be used for a heavier-than-air, fixed-wing aircraft. The new method of control could be used in flight and for when on the ground. This method of control could be for an actual or virtual vehicle, or simulation.

The new method control uses a handlebar to concurrently and independently affect pitch, roll, and yaw. In addition, the new method of operation concurrently controls steering when on the ground. Steering on the ground is independent of pitch and roll, but in conjunction, or managed with the same movement, as the control of yaw.

The new method of control achieves the three axis of fixed-wing flight with the manipulation of a single lever, or handlebar. The operator moves the handlebar. The movements are translated to affect a vehicle. There are three movements; each is associated with one of the three axis of fixed-wing flight. The movement that is associated with yaw is also associated with ground steering.

The disclosed invention may make use of a joined yaw and roll flight control method, which actuates the rudder and ailerons in unison. This would retain the rotation and lift capabilities of the handlebar but forgo the tilt. The control of roll, which had been manipulated by tilt movement, would now be integrated in with the control of yaw.

FIGURES—REFERENCE NUMERALS

Figure 1:
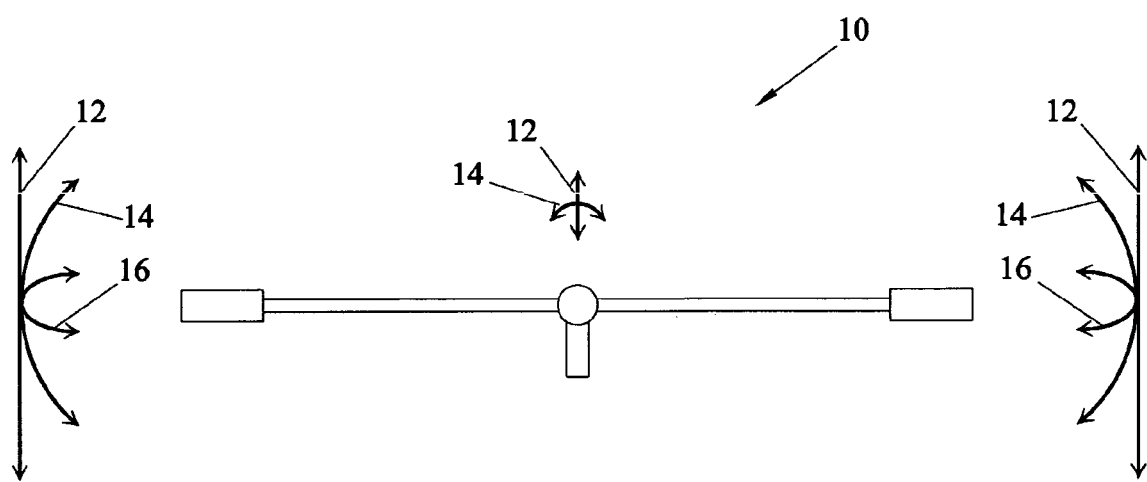
FIG. 1 shows a diagram of three types of movements of a horizontal bar in a side view

10 . . . Control Bar Apparatus
12 . . . Y Axis "Up and Down" Movement
14 . . . X/Y Plane "Tilting" Movement
16 . . . X/Z Plane "Rotating" Movement
20 . . . Pole and Slide Configuration
22 . . . Handlebar
24 . . . Vertical Rods
26 . . . Sleeve
28 . . . Articulating Member
30 . . . Connecting Rod
32 . . . Anchor Plate
40 . . . Ring
42 . . . Ridged Pole 44 ... Cables
46 ... Handlebar Connectors
50 ... Rod and Plate Mechanism
52 ... Rod
54 ... Plate
60 ... Rod and Plate Vehicle System
62 ... Secondary Plate
64 ... Rotational Member
68 ... Connector Members
70 ... Secondary Hinge Members
72 ... Secondary Control Members
74 ... Forks
76 ... Front Wheel
80 ... Transfer Controls
82 ... Second Elevator Rod
84 ... First Elevator Rod
86 ... Rotational Member
88 ... Tertiary Connector Members
90 ... Larger Rotational Member
92 ... First Cable Member
94 ... Second Cable Member

DETAILED DESCRIPTION

Referring to the drawings, a preferred embodiment of a method and a mechanism for controlling an airborne vehicle constructed by integrating a motorbike and a fixed wing flight device is explained. The present invention provides a control apparatus that is to be installed on a conventional motorbike and a mechanism for connecting the control apparatus to the handlebar of the motorbike.

Referring to FIG. 1, the control apparatus 10 is located on top of the fork, holding the handlebar. The control apparatus 10 comprises two parallel vertical rods 11, a sleeve 12 on each vertical rod and a connecting rod 13 connecting the sleeves. The ends of the vertical rods 11 are connected to the motorcycle, represented herein by plates 14. The sleeves 12 can slide together along the vertical rods 11. The connecting rod 13 passes between the vertical rods 11.

Figure 2:
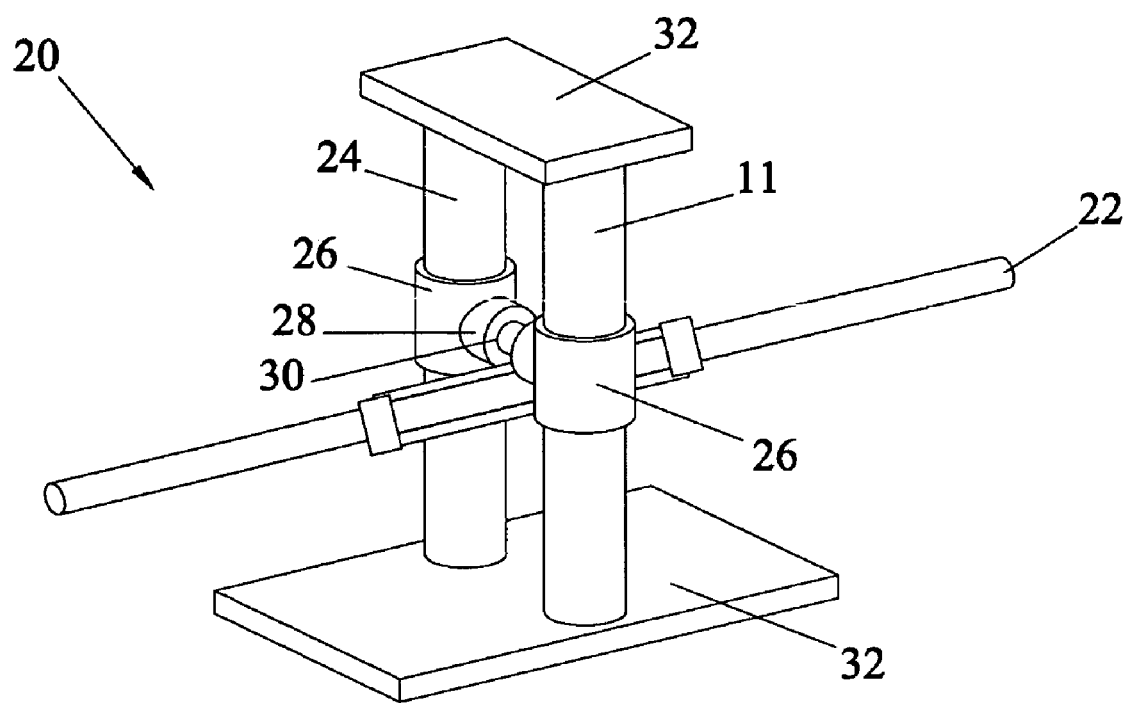
FIG. 2 shows a control apparatus in accordance with the present invention.

Referring to FIG. 2, the mechanism for connecting the control apparatus to the handlebar is explained. The connecting rod 13 is connected along a diameter of a ring 15 surrounding the vertical rods 11. Two connecting pieces 16 extend outwardly from the ring 15 and are inline with the connecting rod 13. The interface between the connecting pieces 16 and the ends of the connecting rod 13 comprises a hollow profile 17 for receiving the ring 15. A handle connecting rod 18 is used to connect the ring 15 and the handlebar. Cables 19 are used to connect the connecting pieces 16 to the handlebar of the motorbike.

As the handlebar is raised and lowered, the handle connecting rod raises and lowers as the sleeves move up and down. The connecting pieces and connecting rod 13 or handle connecting rod 18 rotate when the handlebar is tilted. Finally, the cables connecting to the flight control surfaces are pulled as the handle is rotated.

Figure 3:
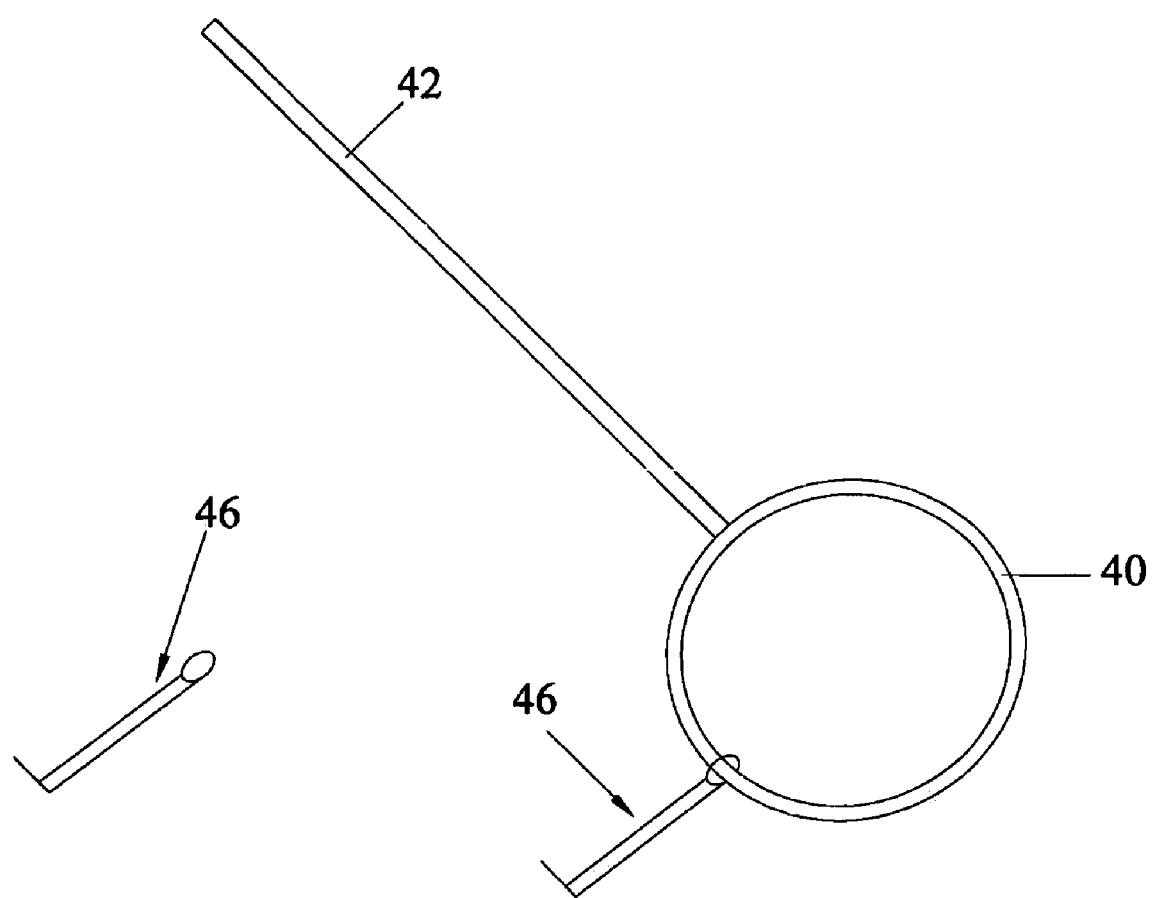
FIG. 3 shows the handlebar connectors, ring, and pole of the mechanism for connecting control apparatus to the handlebar.
Figure 4:
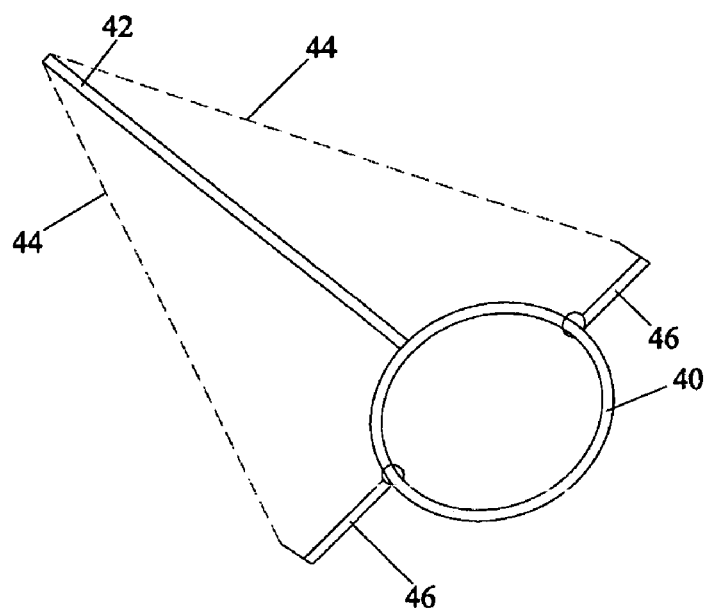
FIG. 4 shows a ridged pole and loop configuration for connecting the control apparatus to a flight device.
Figure 5:
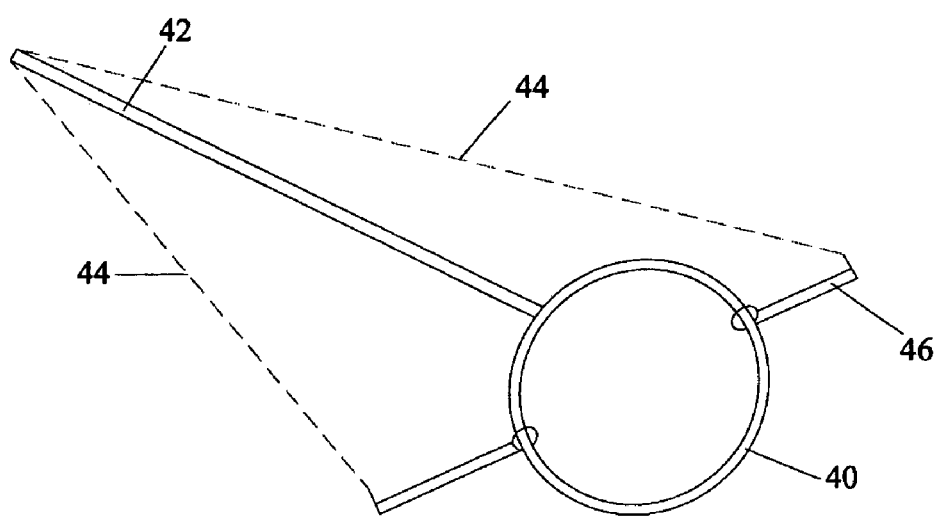
FIGS. 5 and 6 show different positions of the handles, and therefore the movement, of the handles about the loop
Figure 6:
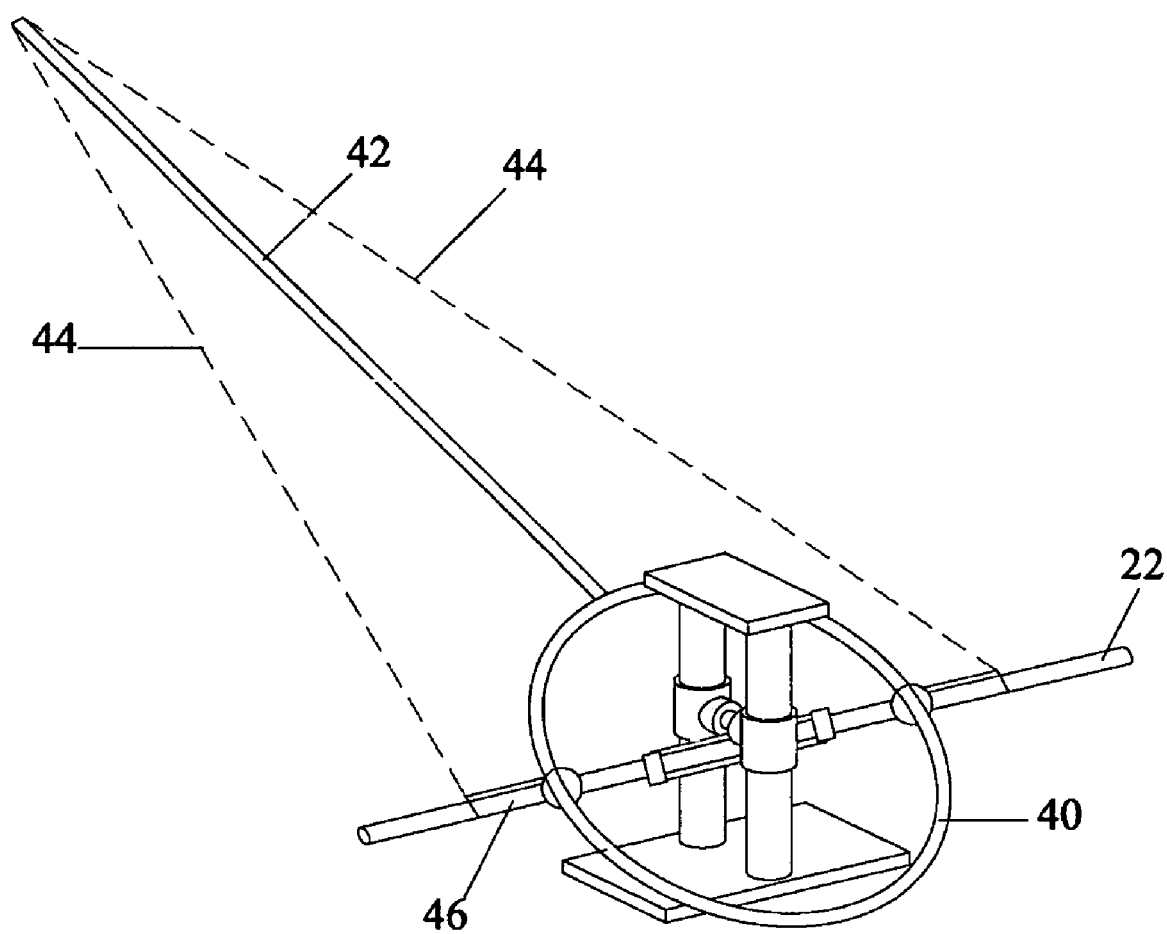
Figure 7:
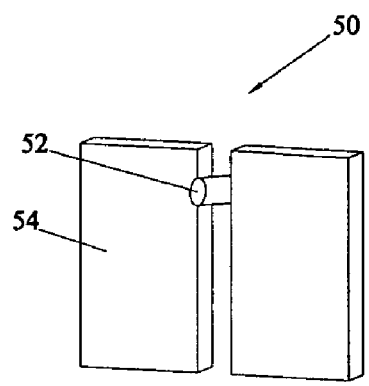
FIG. 7 is an illustration of a plate and peg mechanism

Referring to FIG. 3, a mechanism for enabling the handlebar to maintain its normal rotation for steering the front wheel is also provided. The mechanism comprises two flat plates 20 and a fastener 21 passing the between the two plates for securing the plates 20 to the handlebar 22. The flat plates 20 are in connection with the front wheel 23. As the handlebar 22 is rotated, the plates and, in turn, the front wheel are also rotated. The raising and lowering and tilting movements of the handlebar will not effect the normal rotation of the front wheel of the motorbike. In addition, a means to restrain the tilting, raising, and lowering movements of the handlebar can also be provided for the motorbike to be safely driven on the ground.

Figure 8:
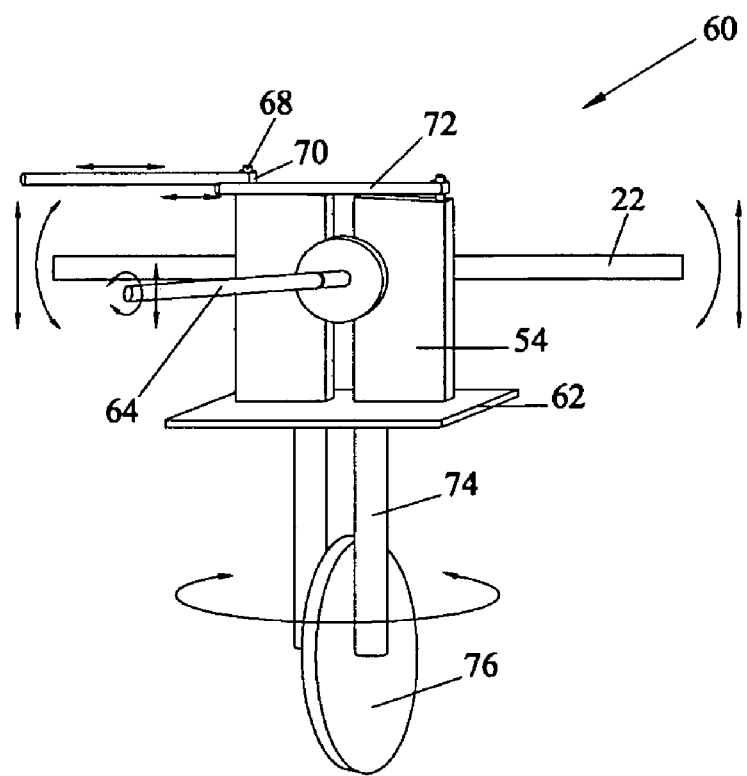
FIG. 8 is an illustration showing a plate and peg control mechanism.
Figure 9:
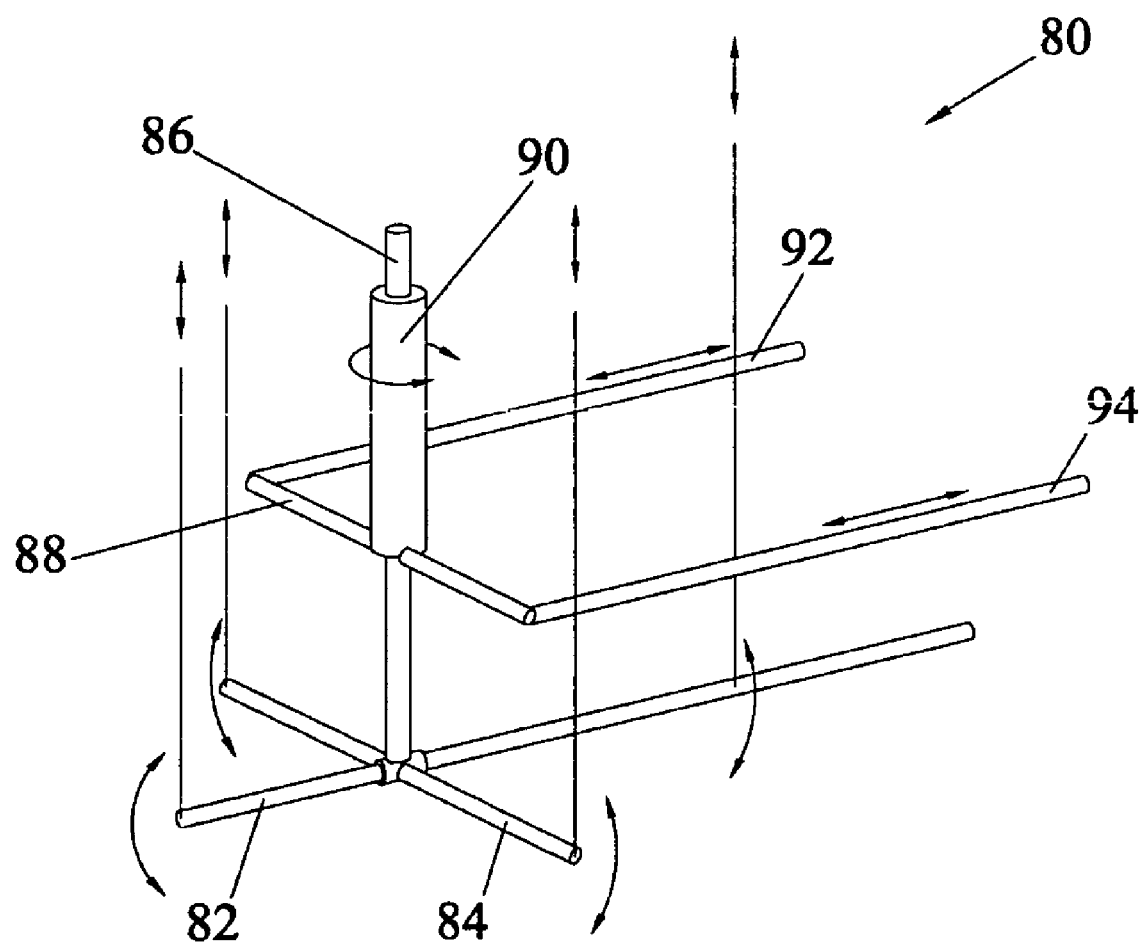
FIG. 9 is perspective view of a mechanism that translates the movements of the plate and peg control mechanism.

A movement transfer mechanism would take the movements from the handlebar and translate those movements into movements that could be used to actuate flight control surfaces. FIG. 9, Transfer Controls 80 are connected to FIG. 8, Rod and Plate Vehicle System 60. FIG. 9, Second Cable members 92 and 94 is the extension of FIG. 8, secondary control member 72 and connector member 68. As is, Control Member FIG. 9, Second Elevator Rod 82 the extension of Rotational Member 64. FIG. 9 Rotational Member 86, and vertical cables from Elevator Rods 82 and 84 connect to the flight device to actuate the flight control surfaces in a fixed wing flight device.

A hinge-like connection allows the handlebar to be raised and lowered without raising and lowering the front wheel. The hinge-like connection comprises two pieces, a first piece connected to the fork and a second piece connected to the handlebar. When the handlebar is raised and lowered, the hinge-like connection opens and closes. In this embodiment, the handlebar is able to raise and lower independent of the fork area of the motorcycle, while still maintaining rotational rigidity.

The control apparatus is fixed to the motorbike's fork by using clamps. The control apparatus is provided with holes, which are made to line up with the positions of the bolts that hold the clamps. The other way of attaching the control apparatus is by having the bottom of the apparatus to be a horizontal lateral bar to emulate the handlebar. This bar can be clamped using the original mechanics for clamping the actual handlebar.

The expected best use of the invention would be for the enabling of the union of a retail motorcycle and flight device to be used for air/road travel of an individual alone or with one passenger. This travel would be for when the weather is generally clear, and equate to a 50% to 70% reduction of travel time if travel had been without flight. Air travel could occur at moderate cruising airspeed of around 95 mph. This travel would have an advantage over other forms of air travel, as separate ground transportation would be not required for the operator and passenger, with some luggage, as the motorcycle would be separated from the flight device and used for road travel. The flight device, with motorcycle, would have a combined cost near the average automobile, as the invented method of control and manner of attachment would enable the use of conventional fixed-wing flight mechanics and a commercially acquired motorcycle.

The invention would have been installed onto a retail motorcycle; it would be located on the top of the fork, holding the handlebar. The design and embodiments of the control device will be explored in further detail below. The control device will enable the motorcycle handle bar to be moved in the up/down and tilt movements and will not effect the rotational movement of the handlebar in the current control of motorcycle steering, it would also have a locked mode which would prevent these additional movements and only allow the rotational movement of the handlebar in the current control of motorcycle steering.

This motorcycle would most likely be of the "dual-purpose" style. This style is designed for on-road and off-road use. Lightweight, 250 to 350 lbs; moderate displacement, 250-450 CC; with large suspension travel, semi-knobby tires, and equipped with headlights, break lights, and turn signals for road use. It may also have conventional retail saddlebags or racks for the carrying of a small amount of luggage. It may also have a retail GPS navigation device with road and air functionality, this GPS unit could be mounted on to the top of the invention, in front of the operator's view. This motorcycle, to be used with the invention, would also have had installed sockets for the quick, temporary, physical attachment of a flight device.

This motorcycle, with the invention attached and in the locked mode, would perform without material difference to the motorcycle prior to the invention having been installed. The motorcycle would be used to travel on public roads, from a ground location, to an airfield where the flight device would be located.

The flight device could be of a tube and fabric design of general dimensions that resemble the two-person, trainer-style, ultralight-style embodiment. These flight devices have a cost that can be less than, or near, the cost of an average automobile. They travel at moderate airspeeds between 75 and 95 mph, and are equipped with aircraft motors from 55 to 100 horsepower. This flight device would be specially designed for use with the disclosed control device invention. As this flight device would be equipped with a standard engine/propeller, standard flight control surfaces (ailerons, rudder, elevator) a special control connection device, and a special physical connection device. This flight device would have a physical opening for the positioning of a motorcycle. This opening would be instead of the conventional cockpit, seats, and standard flight controls.

It is expected that the combination of the flight device and motorcycle would be of a weight, power, flight speed, and other attributes that would permit the operation within the Federal Aviation Administration's (FAA) Light Sport (LSA) category of aircraft. A person who has earned a Sport Pilot certification, a new (September 2004) simplified flight program, is permitted to operate this category of aircraft. The aviation industry is expecting this new Sport Pilot certification to achieve great popularity.

Once driven to the location of the flight device, the airport, the motorcycle would be dismounted and positioned under, or within, the flight device. For some models this flight device would be of a pipe and fabric construction, lighter than aluminum sheet. The flight device would consist of a wing, equipped with ailerons for roll actuation. For some models the flight device would be a tail design, with a rear elevator flight control surface for the actuation of pitch, canard designs would have the elevator on the front of the craft. It would be expected that the flight device would have a manner of propulsion, Rotax and Teledyne Continental Motors have piston engines developed for specifically for this type of aircraft. The propeller, if mounted in a pusher configuration, would be behind the main wing. This would improve safety as, if the craft were to nose-down, the spinning propeller would not contact the ground.

At this time a visual inspection of the flight device would be performed to inspect its physical condition and fill the flight gasoline and oil. The flight device would have been secured to the ground for storage to protect it against wind damage. It would most likely have manually retractable supports for the holding of the flight device above the ground when not supported by the motorcycle. The motorcycle would be positioned under the flight device for the connections to be made.

Attaching the motorcycle to the flight device would happen in two steps. First the physical connections would be made and then the control connections. The motorcycle would be affixed with sockets that would receive struts from the flight device. These sockets would have been attached when the invention was installed on the motorcycle. They would enable the flight device to be quickly attached with a temporary pin or clamp. The flight device would have physical structure that would enable support struts, or bars, to attach to a motorcycle for physical incorporation.

The control connection could take on several different embodiments but would be maximized for simple and quick attachment and detachment. This will be further described in the area below regarding the making of the control device and the connection device. This control connection would be affixed at this time and the control device would be unlocked to enable the additional movements of the bar, up/down, and tilt.

At this time, once the motorcycle and the flight device are attached by physical means and the control device is connected to the flight device by the control connection means, the connections would be tested. The movements of the control bar would be moved to test that the connections translate to the appropriate flight control surfaces and are without snag or excess friction. The physical attachment of the motorcycle would be tested to prove effectively secure to the flight device.

The retractable supports would then be released and the weight of the flight device would rest on the motorcycle. These supports could then be lifted and stored on the wings. These ground supports may be located at the wing struts or tips. When secured they would hold the aircraft level. The aircraft would then be untied from the ground. The release of these ties may require the aircraft to be tilted on to one wing tip. If the craft was not to include outriggers, as the tiedown is released the released wing would be lifted gently so that the lowered wing rests on the ground. At that time the tie for the lowered wing would be released.

For the protection of the wingtips there may be a scrapper pad or a small wheel. This scrapper would be of a lightweight and strong material that may be a PVC type pad. This scrapper would allow the rubbing, sliding, of the ground without physical damage.

The aircraft may be tipped, leaning on a lowered wing. The pilot would mount the aircraft and seatbelts would be fastened. Headsets, GPS, portable communication radios, cell phones, and other portable devices would be attached and tested at this time. A final test of the flight control movements would be performed.

The pilot would hold the ground breaks on the motorcycle using their left foot and/or right hand, and start the flight motor. The flight motor controls would be on the flight device, placed either above, or to the side of the operator. Holding the breaks, the pilot would review the performance of the flight motor using engine instruments, affixed to a panel that would be above, or to the side of the operator, attached to the flight device. These instruments could include altitude, wind speed, and other VFR or IFR instrumentation. The radio could also be tested and used to confirm the settings of other instruments at this time.

Now ready to move to the runway for takeoff the operator would need to upright the craft. The craft may already be in a upright mode if the operator was able to mount the device with assistance and the wind was calm or if the supports were self-stowing, affixed with spring loaded ability so that the forward movement of the aircraft would prompt them to lift up into a stored position under the wings once the weight of the craft was removed.

The motorcycle engine could be started at this time. If the aircraft is in a tipped mode the motorcycle engine may be best equipped to assist the operator with the performance of a righting action. To do this action the operator would turn the aircraft sharply toward the tipped wing, and then apply swift power, while releasing the breaks. This turning force would lift the lowered wing and begin forward movement. If the craft were already level the forward movement could begin with or without the use of the motorcycle engine.

The aircraft may be equipped with outriggers that have wheels to support the craft for level ground maneuvers. This may not be a requirement because the in-line two wheels of the motorcycle and the ailerons may be enough for the operator to balance the craft.

One of the advantages of the invention is the enabling of this balance. Alike to the riding of a top-heavy bicycle, using the skills of two-wheeled balance, this would enable the craft to tilt, lean in, toward a turn, or crosswinds. This would enable much higher taxi speeds because the craft could be leaned, thus counteracting centrifugal force that would push the craft over. Moving from the parking area to the runway could be safely performed at speeds much greater than currently available to aircraft. These distances vary but the distance is at least the length of the runway, several hundred yards. The time saved here would help the feeling of freedom and speed, setting a new standard to what was never questioned as a limit.

When moving forward the wings would be getting wind movement over the ailerons. This would enable the operator to control the balance, tilt, or roll, of the craft on the ground. Once the craft is stopped this wind assistance may stop, unless ambient wind were coming from the front. If there were no opportunity for the craft to be stopped facing-in to the wind, in order to keep balance, and there was a wind that was too strong for the operator to keep the craft balanced by putting down their feet, then the craft would need to be tipped downward. It would be best to tip the windward wing down, to assist with the righting maneuver.

While ground maneuvering the motorcycles large wheels and suspension travel would allow the aircraft to transverse unfinished ground better that most other aircraft. Small holes would be easily rolled over; pits and dips would be absorbed by the motorcycles suspension. If the airport were grass, and there had been rain, the motorcycle's drive wheel, and knobby tires, could get the craft through the softest/muddiest ground. This could enable this device to be used on farms or fields that had never been prepared for aircraft.

At the runway, positioned for takeoff, both engines would be running, the flight engine connected to the propeller and the motorcycle engine as normally connected to the drive wheel. While the flight engine would suffice for takeoff and flight, it would be preferred to use both engines. The high-torque of a motorcycle engine is well prepared to assist with getting this craft up to speed. Other aircraft do not have drive wheels on the ground so they rely on only the thrust of the propeller.

The pilot would power-up the flight motor to full, begin down the runway using the control device handlebar for steering and balance. Engage the motorcycle thrust. When at speed, the control device handlebar would be manipulated, and the aircraft would attain flight. In flight the motorcycle drive wheel would have no utility so the motorcycle engine would be turned off.

Airborne, the aircraft may require adjustments like trim control. Trim is used to set the pitch of the aircraft so that the pressure on the elevator control can be neutralized. This control is best adjusted while pressure is kept on the elevator control, in this case, the lifting of the handlebar. It may be best that the trim adjustment be on the handlebar so that the adjustments can be made without the release of a hand on the bar. Once trim were properly adjusted the bar would be able to be released, and if the craft were properly tuned for yaw, the craft should tend to be neutral, thus fly straight and at the climb rate set by the thrust and trim. More details on the making of the trim control follow in the description below.

Once set, the operators hands would be free to control other devices, GPS, radio, or otherwise. Simple directional adjustments could be made with one hand, as normal cruising could be with one hand, if preferred. Two hands would be required for coordinated turns (where the craft doesn't slip, and the altitude is constant, actuation of the rudder, ailerons, and elevator are all required to perform), necessary in takeoff and landing.

Turns would be made by the movement of the handlebar, in a rotate, tilt, and lift manner. As in most fixed-wing aircraft, a turn is made by roll, yaw, and pitch adjustments. The control device invention could be used by rotating the handlebar which could actuate the rudder. The rudder yaws the aircraft and begins the directional change. Tilting the handlebar could actuate the ailerons that roll the aircraft, to obtain the correct turn attitude. Lifting the handlebar could be used to accurate the elevator that provides additional lift to keep the aircraft at the same altitude. These adjustments can result in an efficient and coordinated turn.

Simultaneous control of the three flight-axis can actuate a coordinated turn, that simultaneous and uncoordinated manipulation of the flight controls are needed for a 'slip.' Uncoordinated because the yaw is forced to conflict with the assumed desired roll of the craft. While the nose is pushed one direction the wings are rolled in the other. This maneuver could be performed to quickly lose unwanted altitude without gaining airspeed. Another reason for uncoordinated manipulation is for a cross-wind landing. In a cross-wind situation there is wind blowing from the side instead of the desired landing headwind. In order to best land the vehicle facing-forward the yaw and roll controls are in conflict as the nose is pointed straight down the runway, the wings are tilted to keep the craft from being pushed away from the runway.

A few aircraft use a modified method of coordinated yaw and roll control, specifically an Ercoupe aircraft. This aircraft actuates the rudder and ailerons in unison. This is argued to improve safety by limiting the situations that an unskilled pilot could have an accident. The disclosed invention may make use of this joined control method.

Having located the destination landing field the pilot could, reduce the flight engine thrust and set flaps for slow-flight and decent. Flap controls would be part of the flight device, like the flight engine throttle, and located above or to the side of the operator. The control device handlebar would again be used to fly the aircraft through the appropriate approach, and landing. The motorcycle's improvement over conventional aircraft wheels and ground suspension would again be an advantage as the motorcycle/aircraft would be more forgiving to damage on hard landings. As a motorcycle allows the operators to lift oneself off of the seat, the operator in rough ground or on landing could lift them self off of the seat slightly and use their legs to absorb additional force of the landing.

Motorcycles are equipped with strong breaks that would reduce landing distances, as increased stopping power would be available. Also, power could also be applied to the breaks more strongly as the in-line placement of the ground wheels would remove the risk of "ground-loop." This accidental maneuver is dangerous and often costly, as the aircraft, if uneven breaking is applied to the ground wheels, performs an exaggerated yaw rotation on the runway. This is most common in tail-wheels configuration of aircraft as there are two front wheels that require even breaking power.

The aircraft would then taxi to a tie-down location. The engine would be turned off. One wing would be lowered to the ground. The device dismounted. The upper wing support lowered, then the lower wing lifted, and the support lowered. At this point the supports would lift the weight of the flight device off of the motorcycle. The control connection device would be disconnected and then the physical connections would be removed. The control device would be sent in locked, or road mode. The resulting motorcycle, with locked control device, would be used to travel to the final destination.

To keep costs low the flight device could be marketed as a self constructed kit. This saves the costs of manufacture and because of manufacture's liability considerations, the cost of the kits are lower than the cost of completed aircraft. Another option are new kits that have been approved as an experimental light sport aircraft (E-LSA) by the FAA, which are quick kits, and S-LSA which are factory manufactured, by self maintained. Ultimate incarnations could be fully FAA certified aircraft.

The invention could be applied to a single seat version that would use an un-powered bicycle instead of a motorcycle. This version could be made with a mountain-bike style of bicycle that is very light and would have suspension. If the device were under a certain weight, 250 lbs., this embodiment of the device would be able to be piloted as an ultralight, and require no license. This version of the device may be used for training, as the regular device may not generally have two sets of controls. This embodiment could use foot pedal clamps for securing the pilot in lieu of seatbelts.

The device itself would be comprised of the mechanics to allow the movement of the bar or up/down and tilt, and would keep the rotational movement fixed with the movement of the front fork of the motorcycle. This could be accomplished in a number of configurations.

A pole and slide configuration would have two or four vertical rods. On these rods would be mounted sliding rings that would move up/down. The sliding rings would be connected by a central, or front/back, positioned rod. This rod would have mounted on it a ring that would enable the tilting movement. This ring would have the handlebar connected to it.

A telescoping configuration would have a series of nested rings, that would be of such shape as to allow the lengthening and compacting, like a telescope. These rings would have to be not circular, because circular rings would be able to spin within each other. This device must retain rotational stability for the control of steering. So for the telescoping configuration these rings would need to be a square, rectangle, or oblong shape, or any shape that would not allow rotation. This telescope structure would have a holder for the handlebar on the top. This holder would allow the tilting movement by a ring, or hinge, at the top.

A hinge configuration would have the handlebar fixed on to a hinge that would be facing the operator. This hinge would connect two pieces, one connected to the fork and another connected to the handlebar. This would allow the handlebar to be lifted/dropped and the hinge to open and close. At the mounting for the handlebar there would be a ring and rod that would allow the handlebar to tilt. So the handlebar would lift/drop and tilt, without rotating.

The device would be affixed to the motorcycle's fork by either removing the clamps or using the clamps. In the removing embodiment the device would have holes for bolts to hold it down. These holes would line up with the positions of the bolts that held down the original clamps. The device would be placed on to the fork where the clamps had been and bolts would hold the device to the fork by being affixed to the fork, through the holds on the device. The other way of attaching the device to the motorcycle fork is by having the bottom of the device be a horizontal lateral bar to emulate the original handlebar. This would then be clamped where the handlebar would have been using the original mechanics for clamping the original handlebar. This will allow the device to fit on to more types of motorcycles and bicycles without modification but may require the device to be taller than the other method and may require more stringent installation to secure the device against movement.

One method of control connection could be a bar and loop design. This would be placed on top of the control device then strapped, or latched, together. This design would translate the movements of the control handlebar using a rod and cables. The bar and loop would come down from the flight device and have a loop at the end. The loop would fit around the control device. On the loop would be pieces that would be connected to rings on the loop that would enable them to move along the loop, but not be removed. Cables would be attached to these pieces so that the movement of the pieces along the ring would be translated to the flight device to actuate the flight control surfaces. In addition the rod would be connected to the flight device so that the movement of the rod would be translated to actuate flight control surfaces.

In this embodiment the rod and loop design enables the movements to be concurrent and independent: as the handlebar is lifted and lowered the rod raises and lowers. As the handlebar is tilted, the bar rotates. As the handlebar is rotated the cables are pulled. Each movement can happen at the same time as the others, and each movement does not affect the reading of the others. The rotate movement moves the cables, the tilt movement rotates the rod, and the up and down movement is unaffected, and so forth.

A plate and rod embodiment would mount the handlebar to a peg that would pass through two plates. This would enable the handlebar to move up/down and tilt. The plates would fix the rotation so that the handlebar would only rotate with the motorcycle's front wheel.

The translating of these movements and rotations would then be made to actuate the flight control surfaces of ailerons, elevator, and rudder. So the rotate of the handlebar pulls cables, these cables would then be routed, via pulleys and gears, to the rudder. So the lift and lowering of the handlebar would lift and lower the control rod. This would be made to actuate the elevator by a fulcrum to actuate a separate rod, or cables, that would move the elevator. So the tilting of the handlebar would rotate the control bar, this rotational movement of the control bar would be made to control rods, or cables, that would be made to move the ailerons.

This embodiment protrudes from the handlebar forward so does not enable the use of a standard windscreen as the control rod would need to go from the handlebar forward. Therefore other preferred methods of the physical embodiment of the invention would be considered. Shrouded cables are commonly used in aviation and are also used in marine applications, as are hydraulic hoses.

For a shrouded cable method a connection block device would be affixed to the control device to read the movements of the handlebar. This connection block would have the shrouded cables already affixed so that quick release would be enabled. This block would have physical pins, or sockets, that would fit over sockets, or pins, so that the movements of the handlebar are translated to movements in the connection block. This block would then translate the movements, by way of the shrouded cables, to the flight control surfaces.

A combination of rod and shrouded cables may also be preferred. As the lift/lower movement and tilt movements are in relation to the device itself, the rotate movement would be in relation to the motorcycle and the flight device. This would compel that the control box, in order to be only cables, for it to retain reference to the motorcycle or flight device for a static point. Therefore it may be preferable to use a rod to read the control device rotation and for the shrouded cables to read the tilt and up/down.

Another embodiment worth mentioning for its simplicity is the electronic potentiometer and servo. This would be a 'drive by wire' method that is more simple to describe for manufacture but may not be determined to be the preferred embodiment because of weight and safety, as servo motors can be heavy, a dependable source for the electric power would be required. This method would have three potentiometers on each of the movements; these would create signals that would travel by wire to servomotors that would be located on the flight control surfaces of aileron, rudder, and elevator. The strongest attribute of this embodiment is that the connection method would be of simple electronic plug and socket.

The flight device could be of a fixed wing embodiment. It could use conventional three axis flight control surfaces of ailerons (or flaperons), rudder (or rudders), and elevator. It could be of the flying wing type designs that forgo the elevator, tail, canard, altogether. The elevator could be in the front as a canard design or the rear as in a tail design.

What would be unique to the flight device is that instead of a cockpit or seats there would be a cavity or space for a motorcycle or bicycle to be installed. This flight device would fit around or over (or under) a ground vehicle.

The flight device would be equipped with a control connection device. This control connection device as explained above, would enable the flight control surfaces to be actuated by the movements of the control device.

Three general models of flight device would be available. The most popular would fit into the LSA requirements of lighter than 1,300 lbs. This would allow the Sport Pilots to use these. This would be sufficient size to allow two passengers, a light by reasonably sized motorcycle, and an adequate cruising speed. Other embodiments of the device would be lighter and heaver. The lighter model could aim to be within the ultralight guidelines of lighter than 255 lbs and only the pilot. This model would use a mountain bicycle instead of the motorcycle, and a much smaller engine. This model would not really permit many of the advantages of road travel; it could be for training, novelty, or sport adventure travel.

Because of the increased height and improved stopping power of the aircraft, it could be a safety and balance advantage to have the propeller in a pusher configuration. This aircraft may have the risk of topping forward during hard breaking so it would be safer to have the pusher configuration.

The flight device could have retractable supports for the holding of the flight device off of the ground while the motorcycle is not attached. These supports could lower on a hinge from the wings. They could have a center hinge so that when they are lowered they can be straightened to a length that would be slightly higher than the aircraft would sit normally. This would enable the motorcycle to be more easily removed and installed within the flight device. A convenient feature of the supports would be if they were to be spring loaded so that they could hold the aircraft level when stopped so that the forward movement of the aircraft would cause the craft to roll-off of the supports and then they would automatically retract onto a stored position on, or under, the wings.

As the trim control could require adjustment while both hands needed to be on the handlebar, one configuration of the trim adjustment could be on the handlebar itself. The trim could be set using a shrouded cable connection to the handlebar. This cable could be moved, actuating the trim, using a gear shift control of conventional design, thumb, push button, rotating. There are several options available for bicycles.

As the device could need to 'drop a wing' in order to stand still in wind or to be mounted/dismounted. There would be a need for wingtip protectors that could be a simple pad of PVC type material that would scrape along concrete without physical damage. Instead of a simple plate, a small wheel or wheels, of in-line skate, or rolling luggage bag, type and size could be used. The need would be to protect the wing at the point where the wing would make contact with the ground.

There are several options for physical embodiments of aircraft. The lightest and cheapest is of a strut and fabric. These struts can be wood or metal and several different fabric types are available. Aluminum sheet aircraft are more durable for being parked outside and composite aircraft are entering the higher performance market. All of these options would be available for the flight device.

The flight device, or the motorcycle, could have a cockpit or if neither is enclosed that a seat belt restraint would be required. This seat restraint could be on the flight device so that the user wouldn't have to connect and disconnect it from the motorcycle.

Flight instruments would be on the flight device; they could both be mounted to the left and right above the pilot, suspended from the wings. They could also be to the right and left of the pilot on a section of the flight device support structure.

The motorcycle could be equipped with a windscreen and/or fairings for wind protection, or the flight device could have a windscreen. An ultimate embodiment could have a fully covered motorcycle that would be protected from the elements. The physical connections could attach to this rigid cover.

While it is the intent and the expectation that the combination device aircraft would be controllable on the ground using only the two wheels of the motorcycle, it is possible that some users would prefer outrigger wheels. These wheels could be on the flight device to add support for ground operations.

A self-contained trailer could be made from the folding of the flight device. The aforementioned wing protector wheels or outrigger wheels could be used for the trailering. This trailer could be pulled by the motorcycle or by another vehicle.

While any bicycle, motorcycle, moped, tricycle, or scooter could be used there are advantages to some over others. The expected embodiment would be using a dual-purpose motorcycle of approximately 300 lbs, with large suspension travel, and semi-knobby tires. These motorcycles are lightweight, adequate for road travel, and are good for using the device to unimproved surfaces. Heavier motorcycles, like cruisers, are more comfortable on the highway, more powerful, have less suspension travel, provide more room for the passenger, but are heavier. This would require larger wings and may have an engine that would make the device exceed the LSA requirements. The mountain bicycle, or any bicycle, could be used for a very lightweight version. A powered bicycle, or moped could also be applied. A scooter could also be used. They are often automatic transmissions so the operator's feet do not need to operate the shifting or breaking. This would have the control device have the dual break levers, like the skooter's. A motorized trike could be used.

A windscreen on the motorcycle would be an advantage. Ultimate versions with full fairings or complete enclosures would protect from the elements and may permit the device to be used in all temperatures.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, paragraph 6. In particular, the use of "step of" in the claims herein is not intended to invoke the provisions of 35 U.S.C. § 112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A method of control for piloting a forward-moving vehicle through physical space; wherein said method uses a single member; wherein said single member has three-way movement relative to the operator; wherein said piloting consists of two-dimensional piloting and three-dimensional piloting; wherein said three-dimensional piloting consists of pitch, roll and yaw; wherein said pitch, roll, and yaw are controlled through said three-way movement, of up and down, tilting, and rotating, respectively; wherein said two-dimensional piloting consists of steering; wherein said steering is controlled by said rotation of said single member in conjunction with said yaw control.

2. The method of claim 1, wherein said up and down movements are along a y axis, said tilting movement is in an x/y plane, and said rotating movement is in an x/z plane.

3. The method of claim 1, wherein said physical space being actual or virtual; wherein said vehicle comprises a device from the list of devices including but not limited to; a flight device, an airborne flight device of fixed wing embodiment, a combination flight and ground device, a virtual vehicle as would be in a computer application as for training in a simulated environment, an entertainment device, any object that requires maneuvering including objects comprising the list of remote cameras, construction equipment and diving equipment; wherein said vehicle is a combination vehicle comprised of the temporary physical union of a ground vehicle with a separate flight vehicle, or portion of flight vehicle; wherein said combination vehicle, when unified, comprises of a ground vehicle portion and a flight vehicle portion, so as to provide both portions to act in concert as a single unified vehicle; wherein said unified vehicle retains both flight and ground operational abilities of the said ground vehicle portion and flight vehicle portion.

4. The method of claim 3, wherein said combination vehicle, uses conventional moveable flight control surfaces of elevator, ailerons, and rudder; wherein said single member controls said combination vehicle through the manipulation of said flight control surfaces.

5. The method of claim 3, wherein said combination vehicle, uses steering control consisting of a conventional ground-touching wheel or wheels that adjust direction relative to other wheel or wheels to affect direction; wherein said single member controls the steering of said combination vehicle through the manipulation of said steering control of said ground vehicle portion.

6. The method of claim 3, wherein said method of control has a two-dimensional only method of control; said two-dimensional only method of control has single movement relative to the operator consisting of rotating movement; wherein said rotating movement retains said steering control; wherein said two-dimensional only method of control is for the said ground vehicle portion when used once detached and separate from flight vehicle portion and not in said combination vehicle.

7. The method of claim 1, wherein said method of control has two control situation settings, one of those control situation settings would be a two-dimensional only method of control; said two-dimensional only method of control has single movement relative to the operator consisting of rotating movement; wherein said rotating movement retains said steering control.

8. The method of claim 1, where said movement of up and down translates to movement of in and out of said single member from the operator's chest; where said movement of tilting translates to changes in the relative height of right and left sides of said single member to the operator; where said movement of rotating translates to changes in the relative distance of right and left sides of said single member to the operator.

9. A method of control for piloting a forward-moving vehicle through physical space; wherein said method uses a single member; wherein said single member has two-way movement relative to the operator; wherein said piloting consists of two-dimensional piloting and three-dimensional piloting; wherein said three-dimensional piloting consists of pitch, roll and yaw; wherein said pitch, roll, and yaw are controlled through said two-way movement, of up and down, and rotating; wherein said pitch is controlled by said up and down movement; wherein said roll, and yaw are controlled through said rotation; wherein said two-dimensional piloting consists of steering; wherein said steering is controlled by said rotation of said single member in conjunction with said roll, and yaw control.

10. The method of claim 9, wherein said up and down movements are along a y axis, and said rotating movement is in an x/z plane.

11. The method of claim 9, wherein said physical space being actual or virtual; wherein said vehicle comprises a device from the list of devices including but not limited to; a flight device, an airborne flight device of fixed wing embodiment, a combination flight and ground device, a virtual vehicle as would be in a computer application as for training in a simulated environment, an entertainment device, any object that requires maneuvering including objects comprising the list of remote cameras, construction equipment and diving equipment; wherein said vehicle is a combination vehicle comprised of the temporary physical union of a ground vehicle with a separate flight vehicle, or portion of flight vehicle; wherein said combination vehicle when unified, comprises of a ground vehicle portion and a flight vehicle portion, so as to provide both portions to act in concert as a single unified vehicle; wherein said unified vehicle retains both flight and ground operational abilities of the said ground vehicle portion and flight vehicle portion.

12. The method of claim 11, wherein said combination vehicle, uses conventional moveable flight control surfaces of elevator, ailerons, and rudder; wherein said single member controls said combination vehicle through the manipulation of said flight control surfaces.

13. The method of claim 11, wherein said combination vehicle, uses steering control consisting of a conventional ground-touching wheel or wheels that adjust direction relative to other wheel or wheels to affect direction; wherein said single member controls the steering of said combination vehicle through the manipulation of said steering control of said ground vehicle portion.

14. The method of claim 11, wherein said method of control has two control situation settings, one of those control situation settings would be a two-dimensional only method of control; said two-dimensional only method of control has single movement relative to the operator consisting of rotating movement; wherein said rotating movement retains said steering control; wherein said two-dimensional only method of control is for the said ground vehicle portion when used once detached and separate from flight vehicle portion and not in said combination vehicle.

15. The method of claim 9, wherein said method of control has two control situation settings, one of those control situation settings would be a two-dimensional only method of control; said two-dimensional only method of control has single movement relative to the operator consisting of rotating movement; wherein said rotating movement retains said steering control.

16. The method of claim 9, where said movement of up and down translates to movement of in and out of said single member from the operator's chest; where said movement of tilting translates to changes in the relative height of right and left sides of said single member to the operator; where said movement of rotating translates to changes in the relative distance of right and left sides of said single member to the operator.

17. A control device for piloting a forward-moving vehicle; wherein said control device has a single member; said single member to be gripped by the operator's hand or hands; said single member having three-way movement relative to the operator of up and down, tilting, and rotating, wherein pitch, roll, and yaw of forward-moving vehicle are controlled through said three-way movement, of up and down, tilting, and rotating, respectively; wherein steering is controlled by said rotation of said single member in conjunction with said yaw control.

18. The control device of claim 17, wherein said vehicle is a combination vehicle comprised of the temporary physical union of a ground vehicle with a separate flight vehicle, or portion of fight vehicle; wherein said combination vehicle, when unified, comprises of a ground vehicle portion and a flight vehicle portion, so as to provide both portions to act in concert as a single unified vehicle; wherein said unified vehicle retains both flight and ground operational abilities of the said ground vehicle portion and flight vehicle portion.

19. The control device of claim 18, wherein a quick-release mechanism enables the simple attachment and detachment of said control device from flight vehicle portion.

20. The control device of claim 18, wherein said ground vehicle portion is a two-wheel vehicle of bicycle or motorcycle type configuration; wherein said two-wheel vehicle uses conventional handlebar steering controls.

21. The control device of claim 20, wherein said single member is said conventional handlebar; wherein said conventional handlebar is enabled three-way movement of up and down, tilting, and rotating by use of a modified handlebar clamping apparatus; said modified handlebar clamping apparatus to replace the conventional means for static attachment of the conventional handlebar to the fork.

22. The control device of claim 21, wherein said modified handlebar clamping apparatus has a means for locking said movements of up and down, and tilting; said means for locking for use of said conventional handlebar during ground navigation.

23. The control device of claim 21, wherein said conventional handlebar includes standard two-wheeled vehicle controls, including but not limited to throttle, ignition/kill, clutch, lamps, signals, horn, and breaks; and wherein the bar comprises additional controls from the list including but not limited to; a twist handle, buttons, and levers, for the coordinated control of other functions; wherein said single member includes non-standard vehicle controls like those on said combination vehicle, such as flight trim, radio, GPS; said standard two-wheeled vehicle controls connected to said ground vehicle portion using conventional, if only slightly modified or lengthened, methods.

24. The control device of claim 20 wherein said single member is a secondary handlebar; wherein said secondary handlebar has three-way movement of up and down, tilting, and rotating; wherein said secondary handlebar has a clamping mechanism for physical manipulation of said conventional handlebar.

25. The control device of claim 23, wherein the said secondary handlebar includes standard two-wheeled vehicle controls, including but not limited to throttle, ignition/kill, clutch, lamps, signals, horn, and breaks; and wherein the bar comprises additional controls from the list including but not limited to; a twist handle, buttons, and levers, for the coordinated control of other functions; wherein said single member includes non-standard vehicle controls like those on said combination vehicle, such as flight trim, radio, GPS; said standard two-wheeled vehicle controls attached to said ground vehicle portion using temporary physical clamping devices or quick-release plugs.

26. The control device of claim 20, wherein said secondary handlebar clamping has the action of manipulating existing controls on the said conventional handlebar.

\* \* \* \* \*